Patented Jan. 22, 1935

1,988,826

UNITED STATES PATENT OFFICE 1,988,826

PROCESS FOR THE PREPARATION OF SULPHOCYANATE COMPLEX OF PARAPHENYLENEDIAMINE, AND SIMILAR AMINES

Martin Battegay, Mulhouse, France, assignor to Calco Chemical Company, Bound Brook, N. J., a corporation of New Jersey No Drawing. Application October 12, 1929, Serial No. 399,392. In France March 4, 1929

8 Claims. (Cl. 260—130.5)

This invention relates to a complex sulphocyanate of an amine and the general object of the invention is a process of treating such an amine with a sulphocyanate, or its equivalent, and the product thus formed, together with its application to dyes and dyeing processes.

Other objects and features of the invention will more fully appear from the following specification and will be pointed out with more particularity in the claims.

The invention will be illustrated by a particular process, which is the treatment of paraphenylene-diamine, but it is to be understood that this is for the purposes of illustrating the invention and not limiting it to the particular materials used.

Paraphenylene-diamine and similar amines form salts with substantially all acids, due to their basic nature. The union of paraphenylene-diamine with an acid such as sulphocyanic acid, should theoretically produce an ordinary salt. However, by treating the paraphenylene-diamine under certain conditions, one of which will be described hereinafter, a product of a complex nature is formed. This product is stable and well crystallized, and when recrystallized from water, melts at 193°. Furthermore, while containing the radicals of sulphocyanic acid and paraphenylene-diamine, which are detectable by analysis, the new products give neither the typical reaction of the rhodanates with ferric chloride nor that of paraphenylene-diamine to obtain Lauth's violet.

As the characteristic properties of the two constituents of the new combination are masked, it is apparent that a new complex sulphocyanate of the amine has been produced, and it is found that, on the one hand it has the property of linking itself, without decomposition, to mineral acids, such as hydrochloric acid or sulfuric acid and to form with them crystallined and well defined chlorhydrates or sulfates, and, on the other hand has the property of being split into the amine and a sulphocyanate by means of an alkali. If the paraphenylene-diamine complex is treated with an alkali, it will split the complex in paraphenylene-diamine and sulphocyanate.

The new complex compounds may also be readily acetylated and benzoylated to give derivatives which permit of their easy identification.

The general process is to treat the amine with a chemical which contains a sulphocyanate radical, for instance, a soluble sulphocyanate or free sulphocyanic acid. The liquid which holds the amine when it is treated with the sulphocyanate compound should be acidulated so that the treatment of the amine with the sulphocyanate compound takes place in an acid medium. Any suitable acid may be used and mineral acids, such as hydrochloric or sulphuric acids, have been used with success. As previously stated, the sulphocyanate compounds which are used should be such as will give a sulphocyanate radical and may be either a salt or an acid. In case a member of the group consisting of potassium sodium or ammonium sulphocyanate salt, such as ammonium sulphocyanate, is used, more of the mineral acid will have to be used than in the case where a sulphocyanate not belonging to said group or the sulphocyanic acid, is used. The sulphocyanate compound is preferably soluble in the liquid which holds the amine to facilitate the reaction.

After the chemical compounds are thoroughly mixed and have had time to react, the liquid is evaporated until crystals begin to form. The mixture may be heated in order to assist in the evaporation of the liquid and facilitate the reaction if it has not previously gone to completion. When the crystals have begun to form the acid of the mixture is preferably neutralized with a chemical, such as ammonia, which has an alkaline reaction, and preferably an excess of the alkali is used so that the mixture shows an alkaline reaction. If the mixture has previously been heated it is then allowed to cool and the product is crystallized from the liquid, after which the product is separated from the liquid in any suitable manner, as by filtration.

A specific example of preparing the complex sulphocyanate from paraphenylene-diamine is as follows: 25 parts of powdered paraphenylene-diamine are dissolved or suspended in 160 parts of water in a suitable vessel, and 47 parts of ammonium sulphocyanate (NH₄CNS) are added while stirring 75 parts of 36% hydrochloric acid into the mixture. The mixture is then heated on a water bath for several hours until the product begins to crystallize. Then the mass is neutralized with an excess of ammonia and allowed to cool, and the product crystallized from water is removed by filtration with a yield of about 80 to 90%.

Instead of the ammonium sulphocyanate a corresponding amount of any other soluble sulphocyanate may be used, or a corresponding amount of free sulphocyanic acid may be used. Instead of the hydrochloric acid any other suitable acid, preferably a mineral acid such as sulfuric acid, may be used and the amount added to the mixture will correspond to 75 parts of 36% hydrochloric acid, taking into account the fact that if free sulphocyanic acid, or a non-alkaline sulphocyanate is used instead of the ammonium sulphocyanate or other alkaline sulphocyanate, the amount of hydrochloric, or equivalent acid, may be decreased as it will be unnecessary to neutralize the alkalinity of the mixture. Furthermore, any suitable alkaline chemical may be used instead of ammonia to neutralize the acidity of the mixture and render it alkaline for the final crystallization.

Although the complex sulphocyanate which is prepared by this process may have many uses, it is desired to point out that it is of particular advantage in preparing dyes and for use in dyeing generally, because the complex nature of the derivatives of the amine permits great improvements in their application of all constituents in all dyeing operations where these constituents in the usual form are too easily attacked. Specific mention is made of the application in the colors produced by oxidation which lead to aniline blacks, paraphenylene-diamine browns, etc, and where the complex nature of the compounds in question gives them, in addition, the special advantage of neutralizing the harmful effect of the mineral acid present. This latter lessens the attack of the chemicals on the textile fibers, which is a feature of importance.

Although a particular and preferred form of the invention has been disclosed herein and specifically mentioned as an example, it is to be understood that the example given is merely for purposes of illustrating the invention. Other amines such as para-toluylene-diamine are mentioned for use instead of the para-phenylene-diamine. It is, therefore, desired that the claims be construed as broadly as their context, taken in conjunction with the prior art, may allow.

I claim:

1. A method of preparing a complex sulphocyanate of an amine involving the incorporation of a sulphocyanic acid radical with the amine which comprises reacting a primary aromatic paradiamine of the benzene series with a sulphocyanate in an acid medium containing free inorganic acid which is not strongly oxidizing at reaction temperature.

2. A method according to claim 1, in which the free acid is hydrochloric acid.

3. A method of preparing a complex sulphocyanate of paraphenylenediamine involving the incorporation of a sulphocyanate acid radical with a paraphenylenediamine which comprises reacting the paraphenylenediamine with a sulphocyanate in an acid medium containing free inorganic acid which is not strongly oxidizing at reaction temperature.

4. A method according to claim 3, in which the free acid is hydrochloric acid.

5. A method of preparing a complex sulphocyanate of a primary aromatic paradiamine of the benzene series, involving the incorporation of the sulphocyanic acid molecule with the amine, which comprises dispersing the paradiamine in a liquid, acidulating with a nonoxidizing inorganic acid, adding a soluble sulphocyanate, crystallizing out the product formed, neutralizing the acidity of the mixture over and above that due to the complex sulphocyanate itself with an excess of an alkaline material and removing the product.

6. A method according to claim 5 in which the reaction takes place in a water solution.

7. A method according to claim 5 in which the reaction takes place in a water solution, and the mixture is heated after adding the sulphocyanate until crystallization begins.

8. A complex sulphocyanate of an aromatic paradiamine of the benzene series, which is the reaction product of the amine with the sulphocyanate in a nonoxidizing inorganic acid medium the complex compound giving no reaction for diamines to obtain Lauth's violet or for sulphocyanates with ferric chloride.

MARTIN BATTEGAY.